W. CROWELL.
Ventilating Barrels or Boxes.
No. 9,771. Reissued June 21, 1881.
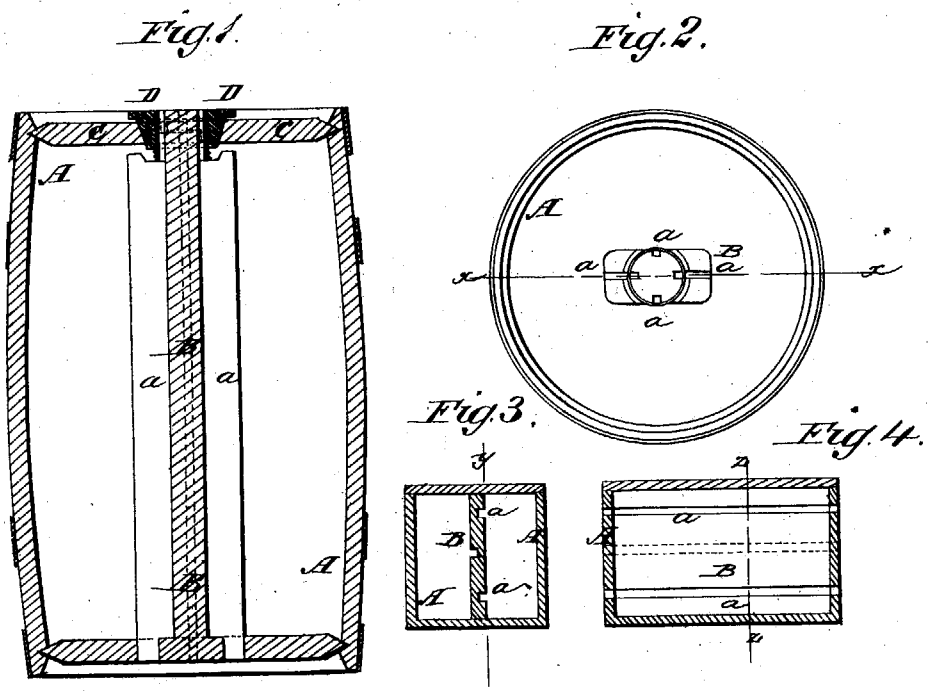
WITNESSES:
Francis McArdle.
A. Sedgwick
INVENTOR:
W. Crowell
BY Munn & Co
ATTORNEYS.
N. PETERS, Photo-Lithographer, Washington, D. C.

UNITED STATES PATENT OFFICE.

WILLIAM CROWELL, OF DENNIS, MASSACHUSETTS.

VENTILATING BARREL OR BOX.

SPECIFICATION forming part of Reissued Letters Patent No. 9,771, dated June 21, 1881.

Original No. 194,994, dated September 11, 1877. Application for reissue filed April 30, 1881.

*To all whom it may concern:*

Be it known that I, WILLIAM CROWELL, of Dennis, county of Barnstable, and State of Massachusetts, have invented certain useful Improvements in Ventilating Barrels or Boxes, of which the following is a specification.

The invention consists in combining a threaded metallic sleeve and flanged nut with an apertured head and grooved post, as hereinafter described.

In the accompanying drawings, Figure 1 is a vertical central section of a barrel embodying my invention. Fig. 2 is a top view of the barrel with the head removed; and Figs. 3 and 4 are vertical transverse and longitudinal sections, respectively on lines *z z* and *y y*, of a ventilating-box.

Similar letters of reference indicate corresponding parts.

A is a barrel, box, or other package for the shipment of articles of perishable or imperishable nature.

B is the center piece, partition, or post of the same, provided with or formed with grooves *a* at the sides, which grooves communicate with the outside air by grooves or openings formed in the head or ends of the barrel, box, or package.

As the decay of articles commences generally in the center of the mass on account of the lack of ventilation, my ventilating-grooves, by allowing free access of air to the center, will retard or prevent decay, and thus avoid the objectionable features in the close packing of fruits, vegetables, and other articles.

In barrels I use, as shown, a sectional and removable head, C, which is secured by a flanged nut, D, with conical body, bearing on corresponding recesses of the head-sections, so as to bind them rigidly into the croze of the barrel. The nut D is upon a thread formed on the end of the center piece or partition, B, or preferably on a threaded metallic sleeve on the same, the ventilating-grooves being extended inside of the sleeve through the head, as shown.

By unscrewing the nut the head-sections may be readily detached and the contents of the barrel removed, and vice versa.

In Figs. 3 and 4 the box or package is entirely divided by the partition B, which is formed with grooves *a* at opposite sides, each portion of the box or package being thus ventilated by grooves formed in the inner wall through the ends, which are apertured to correspond with the grooves.

Having thus fully described my invention, I claim as new and desire to secure by Letters Patent—

The threaded metallic sleeve and flanged nut D, in combination with apertured head C and grooved post B of a ventilating-barrel, substantially as described.

WILLIAM CROWELL.

Witnesses:
SETH TOBEY,
LUTHER HALL.